US010160655B2

(12) United States Patent
Xiang

(10) Patent No.: US 10,160,655 B2
(45) Date of Patent: Dec. 25, 2018

(54) APPARATUS AND METHOD FOR MANUFACTURING AND PACKAGING OF HIGH PERFORMANCE THERMAL INSULATOR AEROGELS

(71) Applicant: Tahoe Technologies, Ltd., Grand Cayman (KY)

(72) Inventor: Xiaodong Xiang, Danville, CA (US)

(73) Assignee: TAHOE TECHNOLOGIES, LTD., Grand Cayman (KY)

(*) Notice: Subject to any disclaimer, the term of this patent is extended or adjusted under 35 U.S.C. 154(b) by 544 days.

(21) Appl. No.: 14/712,712

(22) Filed: May 14, 2015

(65) Prior Publication Data

US 2016/0046495 A1 Feb. 18, 2016

Related U.S. Application Data

(60) Provisional application No. 61/993,989, filed on May 15, 2014.

(51) Int. Cl.
*C01B 33/14* (2006.01)
*C01B 33/158* (2006.01)
*F16L 59/065* (2006.01)
*F26B 5/16* (2006.01)
*C08L 83/02* (2006.01)

(52) U.S. Cl.
CPC .......... *C01B 33/14* (2013.01); *C01B 33/1585* (2013.01); *C08L 83/02* (2013.01); *F16L 59/065* (2013.01); *F26B 5/16* (2013.01); *C01P 2006/32* (2013.01)

(58) Field of Classification Search
CPC .... C01B 33/14; C01B 33/1585; F16L 59/065; F26B 5/16; C08L 83/02; C01P 2006/32
See application file for complete search history.

(56) References Cited

U.S. PATENT DOCUMENTS

| | | | |
|---|---|---|---|
| 4,610,863 | A | 9/1986 | Tewari et al. |
| 5,958,363 | A | 9/1999 | Coronado |
| 2002/0009585 | A1 | 1/2002 | Albert et al. |
| 2002/0114937 | A1 | 8/2002 | Albert et al. |
| 2005/0155663 | A1 | 7/2005 | Dhellemmes et al. |
| 2006/0178496 | A1 | 8/2006 | Lin et al. |
| 2006/0207673 | A1 | 9/2006 | O'Brien et al. |
| 2007/0220904 | A1 | 9/2007 | Jibb et al. |
| 2009/0082479 | A1 | 3/2009 | Cho |
| 2009/0176085 | A1 | 7/2009 | Albert et al. |
| 2010/0279044 | A1 | 11/2010 | Williams et al. |
| 2010/0280171 | A1 | 11/2010 | Williams et al. |
| 2011/0237692 | A1 | 9/2011 | Wu et al. |
| 2012/0112117 | A1 | 5/2012 | Vo et al. |
| 2012/0321873 | A1 | 12/2012 | Costeux et al. |

(Continued)

FOREIGN PATENT DOCUMENTS

WO  WO 2015/175970  11/2015

OTHER PUBLICATIONS

PCT International Search Report and Written Opinion dated Aug. 20, 2015 issued in PCT/US2015/031137.

(Continued)

*Primary Examiner* — Anthony J Zimmer
(74) *Attorney, Agent, or Firm* — Tom Hunter; Weaver Austin Villeneuve & Sampson LLP

(57) ABSTRACT

In various embodiments, novel methods of fabricating and/or packaging aerogels are provided.

30 Claims, 8 Drawing Sheets

(56) References Cited

U.S. PATENT DOCUMENTS

2013/0061492 A1 3/2013 Okuchi et al.
2013/0291858 A1 11/2013 Lasich
2014/0004290 A1 1/2014 Kim et al.
2016/0114304 A1* 4/2016 Li .................... C01B 33/1585
　　　　　　　　　　　　　　　　　　　　　　　34/406

OTHER PUBLICATIONS

Sedlacek, Daniel (Apr. 24, 2009) "Aerogel Synthesis and Application" *A thesis submitted in partial fulfillment of the requirements for the degree of Bachelor of Arts in Physics, Pomona College* 55 pages.
PCT International Preliminary Report on Patentability dated Nov. 15, 2016 issued in PCT/US2015/031137.

* cited by examiner

APPARATUS AND METHOD FOR MANUFACTURING AND PACKAGING OF HIGH PERFORMANCE THERMAL INSULATOR AEROGELS

CROSS-REFERENCE TO RELATED APPLICATIONS

This application claims benefit of and priority to U.S. Ser. No. 61/993,989, filed on May 15, 2014, which is incorporated herein by reference in its entirety for all purposes.

BACKGROUND

In industrialized societies, large amounts of energy are consumed to make up the thermal losses occurring in a wide variety of applications due to poor thermal insulation. For example, in applications involving thermal cycling, thermal insulation is critical to increase system efficiency. In various other applications, thermal insulation is critical to maintain microenvironment temperature. Thus, for example effective thermal insulation reduces the energy expenditure required to heat or cool buildings or appliances such as ovens and freezers.

Silicon oxide (silica) aerogel, basically a glass matrix comprising nano to micro voids, has been proven to be a good thermal insulator, especially for applications at high temperatures and in cases where non-flammable insulators are important. However, due to the high cost and limited insulation performance in large-scale industrial production, aerogels have not been widely used as thermal insulators.

One of the problems that has limited the performance of aerogels as thermal insulators arises from the conflicting requirements necessary to keep both the blackbody radiation and the solid thermal conductivity low. By way of example, for a homogenous silica aerogel insulation layer, the total thermal energy loss ($Q_{eff}$) through the insulation layer is consists of three components: 1) The thermal loss via gas thermal conduction ($Q_g$); 2) The radiation thermal loss ($Q_r$); and 3) The thermal loss via solid thermal conduction ($Q_s$), as described in Eq. 1, below:

$$Q_{eff} = Q_g + Q_r + Q_s \quad \text{(Eq. 1)}$$

where for a slab structured insulation layer, $$Q = \frac{A(T_1 - T_2)\lambda}{\delta} \quad \text{(Eq. 2)}$$

and for a cylinder structured insulation layer:

$$Q = \frac{2\pi\lambda(T_1 - T_2)}{\ln\left(\frac{d_1}{d_2}\right)} \quad \text{(Eq. 3)}$$

where A is the area that the heat flux pass through, $T_1$ and $T_2$ are the temperatures at two sides of the insulator surfaces, $\delta$ is the thickness of the insulation material $d_1$ and $d_2$ are the diameters of the cylinder structured homogenous silica aerogel insulation layer, and the $\lambda$ is the total thermal conductivity that is given by the following equation, $$\lambda_{eff} = \lambda_g + \lambda_r + \lambda_s \quad \text{(Eq. 4)}$$

where $\lambda_{eff}$ is the total effective thermal conductivity of the aerogel, in W/(m·K) which consists of three terms. The first term $\lambda_g$ is the contribution to the thermal conductivity from the gas and is given by the following equation:

$$\lambda_g = \frac{\lambda_{g0}}{\left(1 + \frac{2.3 \times 10^4}{\phi p}\right)} \quad \text{(Eq. 5)}$$

where $\lambda_{g0}$ is the thermal conductivity of the still gas (air) in W/(m·K) since the mean free pass of the gas molecules in silica aerogel is severely limited by the nano or micro voids structure, $\phi$ is the parameter that characterizes this limitation, in μm; P is the pressure, in Pa (see, e.g., Lee et al. (2002) *J. Non-Crystalline Solids* 298: 287-292).

According to the equation of radiative flux $$Q_r = \frac{A\sigma(T_1^4 - T_2^4)}{3\beta\delta/4 + (1/\varepsilon_1 + 1/\varepsilon_2 - 1)}$$

(see, e.g., Howell et al. *Thermal Radiation Heat Transfer* [M], Fifth Edition, Pp. 591-595) and the relation $$Q_r = \frac{A(T_1 - T_2)\lambda_r}{\delta},$$

the conductivity contributed by radiation $\lambda_r$ can be obtained as $$\lambda_r = \frac{\sigma(T_1^2 + T_2^2)(T_1 + T_2)\delta}{3\beta\delta/4 + (1/\varepsilon_1 + 1/\varepsilon_2 - 1)} \quad \text{(Eq. 6)}$$

The second term $\lambda_r$ describes the thermal loss contribution from the blackbody radiation, where $\sigma$ is the Stefan-Boltzmann constant ($\sigma = 5.67 \times 10^{-8}$ W/(m² K)); $\delta$ is the thickness of the insulation aerogel material, $T_1$ is the cold side temperature of the aerogel and $T_2$ is the hot side temperature of the aerogel, in K; $\varepsilon$ is the emissivity of the aerogel; and $\beta$ is the attenuation coefficient (extinction coefficient) of the aerogel, in m$^{-1}$.

The third term $\lambda_s$ is the contribution from the solid thermal conduction of the silica aerogel and is given by the following equation $$\lambda_s = c\rho^b \quad \text{(Eq. 7)}$$

(see, e.g., Zeng et al. (1995) *J. Non-Crystal Solid*, 186: 271-277), where c is a constant that is independent of the aerogel density and the scaling exponent; $\rho$ is the density of the aerogel, in kg/m³; b is a scaling exponent and depends on the aerogel structure, but typically has a value of 2 (see, e.g., Lu et al. (1992) *Science* 255: 971).

According to Eq. 7, one can see that the main advantage of the silica aerogel in the application of thermal insulation is that at very low density it can dramatically reduce the solid thermal conduction. This is why aerogels typically provide better insulation properties than other insulation materials.

However, as one decreases the first term and the third term contribution by reducing the silica aerogel density and the insulation layer air pressure, the second term $\lambda_r$, i.e., the blackbody radiation contribution to the effective thermal conduction becomes important, especially at higher temperature $T_2$ (e.g., when $T_2 \gg$ambient temperature, in K). As indicated by the second term, contribution from the blackbody radiation is to be reduced, the attenuation coefficient β, the total absorption and scattering of the radiation by the aerogel is increased. However, this is in contradiction to the need to decrease the density of the aerogel to reduce the third term, as lower density normally causes lower absorption.

Accordingly, other absorption agents have been added into the to maintain fairly high density and balance the contributions from both the blackbody radiation and solid thermal conduction (see, e.g., Zeng et al. (1995) *J. Non-Crystalline Solids*, 186: 271-277).

One can see from modeling of carbon content to minimize heat transfer in silica aerogels (Id.) that a density of ~160 kg/m$^3$ (~8%) is believed to provide the best overall insulation performance for the silica aerogel and this is the density typically utilized by aerogel manufactures. As noted in Zeng et al. supra., carbon was added into the aerogel and it was found that at ambient temperature, adding approximately 8% carbon into a silica aerogel could lower the total thermal energy loss by about ⅓.

At temperature as high as 600K, the transparent aerogel has 10 times larger total thermal conductivity than that of an opaque aerogel using optimized carbon content. In addition, the optimal carbon content that minimizes the overall thermal conductivity increases with the working temperature. For example at 600K, an aerogel containing about 16% carbon provides the optimal overall insulation performance. However, adding absorption agents actually increases the solid thermal conduction contribution and complicates the manufacturing process (Id.).

According to Eq. 5, the thermal conductivity of gas molecules (air) in silicon oxide aerogels is reduced by the void structures and characterized by the parameter Φ. As described above, the second term contribution may be relatively high at higher working temperatures. Hence, there is no practical value to further reduce the contribution of the first term by reducing gas density (vacuum treatment for the aerogel insulation applications). As a consequence, thermal insulation properties of industrial aerogel have been limited to about 3 times better than other conventional thermal insulators, e.g., to be about 0.02 W/mK.

One of the main costs in the production of silica aerogels has been the requirement for pure ethanol (e.g., ethanol concentration typically better than 99%). IN most approaches for the fabrication of silica aerogels, a gel precursor is formed that mainly contains pure ethanol and organic silicon. Subsequently the ethanol is eliminated from the gel by a supercritical drying process of either ethanol or carbon dioxide/ethanol. Since the ethanol evaporated in the drying process contains a certain amount of water, this ethanol is either typically vented and disposed of as waste or it has to be distilled before reuse. As a consequence, due to the high cost of ethanol and/or ethanol distillation silica aerogels have, to date, been characterized by a high manufacturing cost.

In addition, in previous methods of aerogel fabrication that involve supercritical drying of ethanol, because the ethanol volume expands about 3 times before reaching the supercritical temperature, normally only about ⅓ of the volume of the supercritical drying vessel is filled with gel because the gel has to be completely emerged in the pure ethanol liquid. Moreover, supercritical drying vessels for ethanol are very expensive because they must be built to contain a highly combustible fluid at high temperature and pressure. Because only about ⅓ of the supercritical drying vessel is filled, the utilization rate of that vessel is quite low.

Thus the equipment cost is also relatively high for traditional aerogel manufacturing processes.

Additionally packaging of SiO$_2$ aerogel, for example, into insulating structures, has also proven difficult. Since pure aerogels are very brittle, fiber-glass or other materials have been used as matrix materials to contain the SiO$_2$ aerogel. During the installation processes aerogel powders often fall out the matrix, again leading to poor aerogel utilization.

SUMMARY

Novel design principles, fabrication methods, and apparatus are provided herein to overcome above-mentioned shortcomings. In particular, the methods, apparatus, and compositions described herein dramatically improve the thermal insulation performance of aerogel insulators, while reducing the manufacturing process cost of the silicon oxide aerogel.

In certain illustrative, but non-limiting embodiments, methods and apparatus are provided to re-cycle used ethanol and to maximize the production yield of aerogel. Processes are also provided to evacuate the aerogel after the supercritical drying process, e.g., before cool down to eliminate or reduce residual ethanol or water molecules in the aerogel. Additionally methods are provided that improve the utilization of supercritical drying systems.

In some embodiments, heterogeneous aerogel packaging methods are provided to separately reduce the gas and radiation contributions to the thermal conductivity in aerogel-based insulator structures. In certain illustrative, but non-limiting embodiments, methods of low vacuum packaging of aerogels are used to reduce or eliminate the gas contribution to the thermal conductivity in various insulator structures. For higher temperature applications, quartz (Pure SiO$_2$) and glass packaging materials can be used; for medium temperatures applications, polyimide (PI) materials can be used, and for low temperature applications, various polymers or plastics are used. Packaging containers or bags can be fabricated before the gel formation process. The aerogel precursors are loaded into the packaging container before supercritical drying, and finally vacuum-sealed after supercritical drying. Highly reflective thin films of metals are optionally used to insert between thin layers of aerogel to reduce or eliminate the blackbody radiation contribution to the thermal conductivity. These layers can be either inside or outside of vacuum packaging. In various aspects, the invention(s) contemplated herein may include, but need not be limited to, any one or more of the following embodiments:

Embodiment 1

A method of manufacturing an aerogel, where the method comprises a) providing a supercritical drying vessel containing an aerogel precursor including a silicon alkoxide, an alcohol and a catalyst, where drying vessel includes one or more vents and/or valves that permit fluid flow out of said chamber and wherein said vessel includes a port in communication with a vacuum source;

b) supercritical drying said aerogel precursor by heating said vessel while allowing the pressure in said vessel to increase until a supercritical temperature and pressure is reached and maintaining said supercritical temperature and pressure for a period sufficient to dry the aerogel;

c) returning the vessel to ambient room pressure, and optionally to room temperature;

d) maintaining the heating of vessel or reheating said vessel if it has been returned to room temperature, and applying a vacuum to said port in communication with a vacuum source to degas remaining water in said aerogel and provide a substantially water-free (e.g., dry) aerogel; and e) returning said dry aerogel to room temperature and pressure.

Embodiment 2

The method of embodiment 1, wherein step (c) includes returning said vessel to room pressure, but maintaining an elevated temperature.

Embodiment 3

The method of embodiment 1, wherein step (c) includes returning said vessel to room pressure and ambient room temperature.

Embodiment 4

The method according to any one of embodiments 1-3, wherein said aerogel precursor includes tetramethyl orthosilicate (TMOS, $Si(OCH_3)_4$).

Embodiment 5

The method according to any one of embodiments 1-3, wherein said aerogel precursor includes tetraethyl orthosilicate (TEOS, $Si(OCH_2CH_3)_4$).

Embodiment 6

The method according to any one of embodiments 1-5, wherein said supercritical drying vessel is continuously vented while the pressure and temperature rise to supercritical temperature and pressure.

Embodiment 7

The method according to any one of embodiments 1-6, wherein said chamber is more than ⅓ full of said aerogel precursor.

Embodiment 8

The method according to any one of embodiments 1-6, wherein said chamber is at least 50% full of said aerogel precursor.

Embodiment 9

The method according to any one of embodiments 1-6, wherein said chamber is at least 60% full, or at least 70% full, or at least 80% full, or at least 85% full, or at least 90% full, or at least 950% full said aerogel precursor.

Embodiment 10

The method according to any one of embodiments 1-9, wherein said aerogel precursor is a one-step gel.

Embodiment 11

The method according to any one of embodiments 1-9, wherein said aerogel precursor is pre-polymerized as a two-step gel.

Embodiment 12

The method according to any one of embodiments 1-11, wherein the alcohol in said aerogel precursor is an alcohol including about 2% to about 10% water.

Embodiment 13

The method of embodiment 12, wherein the alcohol in said aerogel precursor is a 95% ethanol or methanol.

Embodiment 14

The method of embodiment 12, wherein the alcohol in said aerogel precursor is a 95% ethanol.

Embodiment 15

The method according to any one of embodiments 1-14, wherein said aerogel precursor includes silicon alkoxide:alcohol in a ratio about 1:(2-4).

Embodiment 16

The method of embodiment 15, wherein said aerogel precursor includes silicon alkoxide:alcohol in a ratio about 1:3.

Embodiment 17

The method according to any one of embodiments 1-14, wherein said aerogel precursor includes silicon alkoxide:alcohol:catalyst in a ratio about 1:(2-4):(0.01-0.1).

Embodiment 18

The method of embodiment 17, wherein said aerogel precursor includes silicon alkoxide:alcohol:catalyst in a ratio about 1:3:(0.01-0.1).

Embodiment 19

The method of embodiment 17, wherein said aerogel precursor includes silicon alkoxide:alcohol:catalyst in a ratio about 1:3:0.06.

Embodiment 20

The method according to any one of embodiments 15-19, wherein the ratio of water in said precursor is about 1.5 to about 3.

Embodiment 21

The method of embodiment 20, wherein the ratio of water in said precursor is about 2.

Embodiment 22

The method according to any one of embodiments 1-21, wherein said catalyst includes an acid or a base.

Embodiment 23

The method of embodiment 22, wherein said catalyst includes a base.

Embodiment 24

The method of embodiment 23, wherein said catalyst includes ammonia and/or ammonium fluoride.

Embodiment 25

The method of embodiment 22, wherein said catalyst includes a protic acid.

Embodiment 26

The method of embodiment 25, wherein said catalyst includes one or more acids selected from the group consisting of hydrochloric acid, hydrofluoric acid, and nitric acid.

Embodiment 27

The method of embodiment 25, wherein said catalyst includes hydrofluoric acid.

Embodiment 28

The method according to any one of embodiments 1-27, wherein said method does not involve an alcohol substitution of the polymerized gel before said supercritical drying.

Embodiment 29

The method according to any one of embodiments 1-28, wherein said vessel is vented during the heating to the supercritical drying temperature and pressure and at the supercritical temperature and pressure.

Embodiment 30

The method according to any one of embodiments 1-29, wherein said supercritical drying is for a period of time ranging from about 10 minutes up to about 2 hours, or from about 15 minutes up to about 1.5 hrs, or from about 15 minutes up to about 1 hour, or for about 0.5 hrs.

Embodiment 31

The method according to any one of embodiments 1-29, wherein said heating in a vacuum is for a period of time ranging from about 10 minutes up to about 2 hours, or from about 15 minutes up to about 1.5 hrs, or from about 15 minutes up to about 1 hour, or for about 0.5 hrs.

Embodiment 32

The method according to any one of embodiments 1-31, wherein said supercritical drying is supercritical drying of said aerogel in an alcohol and the supercritical temperature and pressure is a supercritical temperature and pressure for said alcohol.

Embodiment 33

The method of embodiment 32, wherein said supercritical drying is supercritical drying of said aerogel precursor in methanol.

Embodiment 34

The method of embodiment 32, wherein said supercritical drying is supercritical drying of said aerogel precursor in ethanol.

Embodiment 35

The method according to any one of embodiments 32-34, wherein said supercritical drying is supercritical drying of said aerogel after immersion in an alcohol including about 2% to about 10% water.

Embodiment 36

The method of embodiment 35, wherein said supercritical drying is supercritical drying of said aerogel after immersion in a 95% alcohol.

Embodiment 37

The method of embodiment 35, wherein said supercritical drying is supercritical drying of said aerogel after immersion in a 95% alcohol.

Embodiment 38

The method according to any one of embodiments 32-37, wherein said supercritical drying is at a temperature ranging from about 245° C. to about 265° C., or from about 250° C. to about 260° C. or from about 255° C. to about 257° C.

Embodiment 39

The method according to any one of embodiments 32-38, wherein said supercritical drying is at a pressure ranging from about 6.5 MPa to about 8.8 MPa, or from about 7 MPa to about 8.5 MPa, or from about 7.5 mPa to about 8.3 M, or from about 7.8 to about 8 MPa.

Embodiment 40

The method according to any one of embodiments 32-39, wherein said alcohol is an alcohol that has been recaptured from a previous supercritical drying of an aerogel.

Embodiment 41

The method according to any one of embodiments 32-40, wherein said method further includes releasing said alcohol from said vessel and capturing the released alcohol in a reservoir.

Embodiment 42

The method of embodiment 41, wherein said capturing includes condensing alcohol vapor to a liquid alcohol.

Embodiment 43

The method according to any one of embodiments 32-42, wherein said supercritical drying includes releasing said alcohol from said vessel and passing said alcohol through one or more fluid lines whose inside diameter is sufficiently small to maintain a backpressure sufficient to maintain the supercritical pressure.

Embodiment 44

The method according to any one of embodiments 1-31, wherein said supercritical drying is of liquid carbon dioxide after a solvent exchange of carbon dioxide for said alcohol and the supercritical temperature and pressure is a supercritical temperature and pressure for carbon dioxide.

Embodiment 45

The of embodiment 44, wherein said supercritical drying is at a temperature ranging from about 31° C. to about 50° C., or from about 31° C. to about 40° C., or from about 32° C. to about 36° C.

Embodiment 46

The method according to any one of embodiments 44-45, wherein said supercritical drying is at a pressure ranging from about 1050 psi to about 1300 psi, or from about 1050 psi to about 1200 psi, or from about 1050 psi to about 1100 psi, or from about 1051 psi to about 1080 psi, or from about 1052 psi to about 1050 psi.

Embodiment 47

The method according to any one of embodiments 44-46, wherein said $CO_2$ is $CO_2$ that has been recaptured from a previous supercritical drying of an aerogel.

Embodiment 48

The method according to any one of embodiments 44-47, wherein said method further includes releasing said $CO_2$ from said vessel and capturing the released $CO_2$ in a reservoir.

Embodiment 49

The method of embodiment 48, wherein said capturing includes condensing $CO_2$ vapor to a liquid alcohol.

Embodiment 50

The method according to any one of embodiments 44-49, wherein said supercritical drying includes releasing said $CO_2$ from said vessel and passing said $CO_2$ through one or more fluid lines whose inside diameter is sufficiently small to maintain a backpressure sufficient to maintain the supercritical pressure.

Embodiment 51

The method according to any one of embodiments 1-50, wherein the density of said aerogel ranges from about 0.1% to about 5%.

Embodiment 52

The method of embodiments 51, wherein the density of said aerogel ranges from about 0.5% to about 1%.

Embodiment 53

An apparatus for the preparation of an aerogel, said apparatus including: a supercritical drying vessel including one or more vents and/or valves that configured to vent supercritical alcohol or $CO_2$ into a reservoir chamber configured to capture said alcohol or $CO_2$ released from said supercritical drying vessel during a super critical drying operation.

Embodiment 54

The apparatus of embodiment 53, wherein said apparatus includes a port configured to apply a vacuum to said drying vessel.

Embodiment 55

The apparatus according to any one of embodiments 53-54, wherein said reservoir chamber further includes a port and/or valves and/or fluid lines to deliver captured alcohol and/or $CO_2$ back into said supercritical drying vessel.

Embodiment 56

The apparatus according to any one of embodiments 53-55, wherein said vessel is configured to heat the contents of said vessel up to a temperature ranging from about 245° C. to about 265° C., or from about 250° C. to about 260° C. or from about 255° C. to about 257° C.

Embodiment 57

The apparatus according to any one of embodiments 53-56, wherein vessel is configured to hold contents at a pressure ranging from about 6.5 MPa to about 8.8 MPa, or from about 7 MPa to about 8.5 MPa, or from about 7.5 mPa to about 8.3 M, or from about 7.8 to about 8 MPa.

Embodiment 58

The apparatus according to any one of embodiments 53-55, wherein said vessel is configured to heat the contents of said vessel up to a temperature ranging from about 31° C. to about 50° C., or from about 31° C. to about 40° C., or from about 32° C. to about 36° C.

Embodiment 59

The apparatus according to any one of embodiments 53-55, and 58, wherein said vessel is configured to hold contents a pressure ranging from about 1050 psi to about 1300 psi, or from about 1050 psi to about 1200 psi, or from about 1050 psi to about 1100 psi, or from about 1051 psi to about 1080 psi, or from about 1052 psi to about 1050 psi.

Embodiment 60

The apparatus according to any one of embodiments 54-59, wherein said port configured to apply a vacuum to said drying vessel is a port coupled to a vacuum pump.

Embodiment 61

The apparatus of embodiment 60, wherein a valve is disposed between said vacuum pump and said drying vessel.

Embodiment 62

The apparatus according to any one of embodiments 53-61, wherein said vents and/or valves comprise one or more fluid lines whose inside diameter is sufficiently small to maintain a backpressure sufficient to maintain the supercritical pressure of said alcohol or $CO_2$.

Embodiment 63

The apparatus of embodiments 62, wherein said fluid lines have an inside diameter sufficiently small to maintain a backpressure sufficient to maintain the supercritical pressure of alcohol during supercritical drying of alcohol.

Embodiment 64

The apparatus of embodiments 62, wherein said fluid lines have an inside diameter sufficiently small to maintain a backpressure sufficient to maintain the supercritical pressure of $CO_2$ during supercritical drying of $CO_2$.

Embodiment 65

The apparatus according to any one of embodiments 53-64, wherein said vents and/or valves further comprise a condenser configured to liquefy alcohol or $CO_2$ passing through said vents and/or valves.

Embodiment 66

The apparatus according to any one of embodiments 53—wherein said apparatus includes a heat exchanger to exchange heat from said CO2 or alcohol passing through said vents and/or valves to a heat exchange fluid.

Embodiment 67

The apparatus of embodiment 66, wherein said heat exchange is coupled to another heat exchanger to that said heat exchange fluid heats said supercritical drying vessel and/or alcohol introduced into said supercritical drying vessel.

Embodiment 68

An aerogel-based insulator, said insulator including: two walls defining a volume between said walls where said volume contains an aerogel; and wherein the volume between said walls is sealed and includes a partial vacuum (e.g. a gas pressure lower than atmospheric pressure).

Embodiment 69

The insulator of embodiment 68, wherein said partial vacuum is about 50,000 Pa or lower, or about 25,000 Pa or lower or about 15,000 Pa or lower or 40,000 Pa or lower or about 20,000 Pa or lower or about 10,000 Pa or lower, or about 5,000 Pa or lower or about 15,000 Pa or lower, or about 1300 Pa or lower, or about 1200 Pa or lower, or about 1100 Pa or lower, or about 1000 Pa or lower, or between about 400 Pa and about 1300 Pa, or between about 600 Pa and about 1200 Pa, or between about 800 Pa and about 1100 Pa, or between about 900 Pa and about 1100 Pa.

Embodiment 70

The insulator of embodiment 68, wherein said partial vacuum is about 1000 Pa.

Embodiment 71

The insulator according to any one of embodiments 68-70, wherein said walls comprise a material selected from the group consisting of glass, quartz, and plastic.

Embodiment 72

The insulator according to any one of embodiments 68-70, wherein said walls comprise a high melting point plastic.

Embodiment 73

The insulator of embodiment 72, wherein said walls comprise a plastic selected from the group consisting of polyimide, and Teflon.

Embodiment 74

The insulator according to any one of embodiments 68-73, wherein said two walls are formed from concentric tubes.

Embodiment 75

The insulator according to any one of embodiments 68-73, wherein said two walls are formed from planar sheets or films welded or cemented together.

Embodiment 76

The insulator according to any one of embodiments 68-75, wherein said insulators further comprise an additional layer of vacuum insulation.

Embodiment 77

The insulator according to any one of embodiments 68-76, wherein said insulators further comprise one or more layers of reflective films on an internal or external surface of one or both of said walls.

Embodiment 78

The insulator according to any one of embodiments 68-77, wherein said insulators comprise a port for introduction of an aerogel precursor.

Embodiment 79

A method of fabricating an aerogel insulator, said method including: providing a container characterized by an inner wall and an outer wall that define an internal volume between said walls, and one or more ports into said volume; introducing said aerogel precursor into said internal volume through said one or more ports to provide a container defining an internal volume containing an aerogel precursor; allowing said aerogel to polymerize; and performing a method of making an aerogel according to any one of embodiments 1-52, wherein said providing a supercritical drying vessel containing an aerogel precursor includes placing said a container defining an internal volume containing an aerogel precursor into said supercritical drying vessel; during or after step (d) or after step (e) applying a vacuum to said container; and sealing said one or more ports into said internal volume to provide a sealed internal volume containing an aerogel at a pressure lower than atmospheric pressure.

Embodiment 80

The method embodiment 79, wherein said partial vacuum is about 50,000 Pa or lower, or about 25,000 Pa or lower or about 15,000 Pa or lower or 40,000 Pa or lower or about 20,000 Pa or lower or about 10,000 Pa or lower, or about 5,000 Pa or lower or about 15,000 Pa or lower, or about 1300 Pa or lower, or about 1200 Pa or lower, or about 1100 Pa or lower, or about 1000 Pa or lower, or between about 400 Pa and about 1300 Pa, or between about 600 Pa and about 1200 Pa, or between about 800 Pa and about 1100 Pa, or between about 900 Pa and about 1100 Pa.

Embodiment 81

The method embodiment 79, wherein said partial vacuum is about 1000 Pa.

Embodiment 82

The method according to any one of embodiments 79-81, wherein said walls comprise a material selected from the group consisting of glass, quartz, and plastic.

Embodiment 83

The method according to any one of embodiments 79-81, wherein said walls comprise a high melting point plastic.

Embodiment 84

The method of embodiment 83, wherein said walls comprise a plastic selected from the group consisting of polyimide, and Teflon.

Embodiment 85

The method according to any one of embodiments 79-84, wherein said two walls are formed from concentric tubes.

Embodiment 86

The method according to any one of embodiments 79-84, wherein said two walls are formed from planar sheets or films welded or cemented together.

Embodiment 87

The method according to any one of embodiments 79-86, wherein said method further includes adding one or more additional layers of vacuum insulation.

Embodiment 88

The method according to any one of embodiments 79-87, wherein said method further includes adding or depositing one or more layers of reflective films on an internal or external surface of one or both of said walls.

DETAILED DESCRIPTION

Innovative heterogeneous silica aerogel packaging, manufacturing methods and processes, as well as specific insulation configurations are described herein that allow significant reduction of manufacturing cost and better insulation performance of aerogel-based insulators.

Aspects of the innovations, such as those set forth in various implementations described below, relate to systems and methods of manufacturing silica aerogels and the applications thereof. However, it should be understood that the invention need not be limited to the specific illustrated embodiments.

Aspects of the innovations, such as those set forth in some of the implementations below, may relate to systems and methods of a specific process recipe. However, it should be understood that the inventions provided herein are not limited to any such specific illustrations, but are defined by the scope of the claims and full disclosure.

In various embodiments, methods and apparatus are provided to re-cycle water-containing ethanol and to maximize the production yield of aerogels. In certain embodiments, processes are provided to evacuate the aerogel after the supercritical drying process optionally before the cool down process to eliminate or reduce residual ethanol or water molecules.

Improved Aerogel Fabrication Methods.

Figure 1:
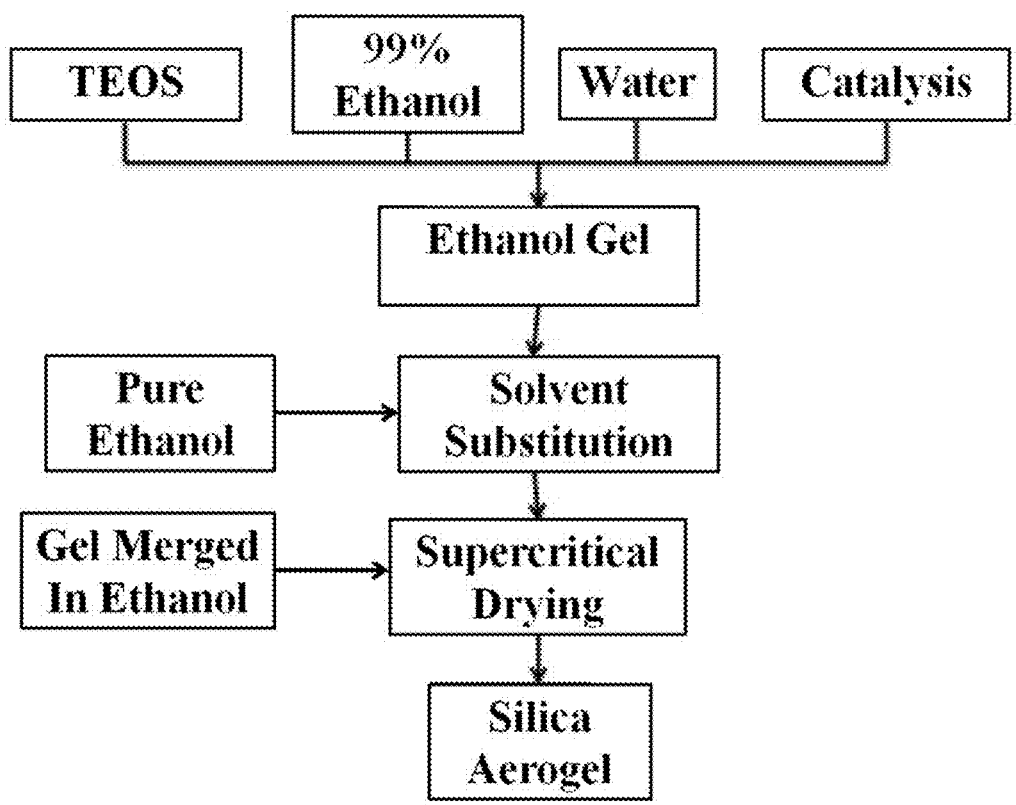
FIG. 1 show a block diagram illustrating traditional silica aerogel manufacturing methods.

Typically, aerogels have been fabricated by combing an organic silicon source such as TEOS, pure ethanol, water, and a catalyst such as an acid (e.g., HFl, HCl) or a base (e.g., ammonia) (e.g., as illustrated in FIG. 1). In one illustrative protocol, the ratio among these ingredients is 1:4:0.25:0.06 for a one-step method. For a two-step method, the pH-value is typically monitored and acid is added until the pH-value reaches 4.5, then the ammonia water solution is added until the pH-value reaches about 8.5. The sol mixture is allowed to gel and this aerogel precursor is put into a container. Typically pure ethanol is added into the container to completely submerge the aerogel precursor gel and the mixture is held for a period sufficient for solvent substitution (e.g., for the alcohol to substitute for water in the aerogel). This substitution step replacing the water molecules with ethanol molecules in the aerogel precursor can take about 48 hours or longer depending on the thickness of the aerogel.

The ethanol immersed gel is put into a high-pressure high temperature reaction chamber (a supercritical drying vessel). Typically the gel only occupies one third of total volume at the lower part of the chamber. Pure ethanol is poured into the chamber to submerge the gel. The chamber's lid will is closed and securely fastened to prevent any possible leakage of the ethanol from the chamber during the heating period. The chamber is then heated gradually to raise the temperature inside the chamber until ethanol supercritical condition is reached and slightly passed. The pressure inside the chamber is closely monitored and controlled by a releasing valve during the heating process to make sure the pressure and temperature do not rise too quickly.

Normally this heating process takes 2 to 3 hours. Because the ethanol volume expands when its temperature rises, the ethanol gradually occupies the entire volume in the chamber and is then released from the chamber via a release valve typically after supercritical conditions are reached. Once the ethanol supercritical condition is reached and passed, the pressure and the temperature are maintained inside the chamber at values slightly higher than the supercritical point. The ethanol supercritical point has temperature of 243° C. and a pressure of 6.4 MPa. Typically in an ethanol supercritical drying process, the temperature and the pressure inside the chamber are maintained at about 255° C. and about 8 MPa. The pressure and the temperature inside the chamber are then lowered by gradually releasing the ethanol vapor from the chamber until the pressure and the temperature inside the chamber equilibrates with the environment, normally at the room temperature and the room pressure. This equalization process typically takes about 1.5 to about 2.5 hours.

Figure 2:
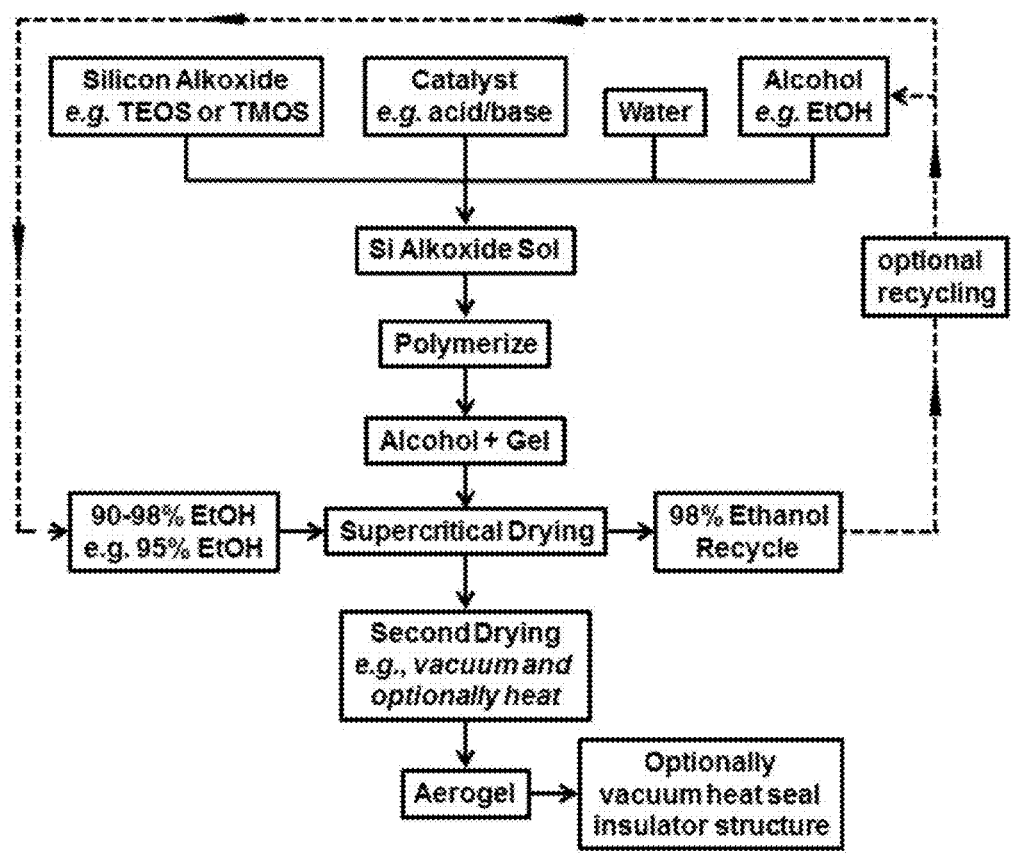
FIG. 2 shows a block diagram illustrating an embodiment of the innovative silica aerogel manufacturing methods described herein.

In various embodiments, as illustrated in FIG. 2, an innovative silica aerogel precursor preparation method is provided to greatly ease the purity requirement for the ethanol used, which reduces the manufacturing cost of silica aerogel significantly. Accordingly, in certain embodiments, integrated ethanol gel preparation steps, devices and methods are simplified and provided. In this way, the overall ethanol utilization efficiency is improved.

In the process, a silicon alkoxide (e.g., TEOS), 95% ethanol and a catalyst (e.g., hydrofluoric acid) are mixed together with ratio of 1:3:0.06. The reaction time for gelation depends on the mass density of the prepared silica aerogel—the lower density, the more reaction time is needed. For example, at density of 160 kg/m$^3$, the ethanol gel precursor reaction time is only a few minutes. However, at density of 20 kg/m$^3$, the ethanol gel precursor reaction time becomes 24 hours.

Additionally, in various embodiments, the solvent substitution step that is used in the above described conventional ethanol gel precursor preparation method is eliminated. This new method saves 24 to 48 hours comparing with the conventional method before the supercritical drying process in the ethanol gel preparation.

In certain embodiments, by exceeding the ethanol gel installation volume limitation (30% volume limitation as described above for the conventional method) up to 80 to 90% in the supercritical drying chamber, the equipment utilization rate is improved by a factor of 3.

Accordingly, in certain embodiments, less than 2% volume of the drying chamber is filled with pure ethanol as a heat transfer medium during the initial heating process. Because the prepared silica aerogel only has 1% its pure density, most of the contents in the ethanol gel consists ethanol and water. These ethanol and water will be released out of ethanol gel during heating up process. Eventually, ethanol and water fill the entire drying chamber, causing the pressure inside the drying chamber to increase as its temperature rises. After the temperature inside the drying chamber passes 243° C., the ethanol reaches its supercritical point while the pressure inside drying chamber exceeds 6.4 MPa. A release valve is opened to gradually release the ethanol out of drying chamber. This ethanol will then enter an ethanol reservoir to be reused later. The concentration of the released ethanol is typically 98% or higher. The concentrated ethanol can then be recycled for further usage. The temperature and the pressure inside the drying chamber is typically kept at 255-257° C. and 7.8-8 MPa range for about one half an hour respectively. The total heating process takes about 4 to 4.5 hours.

In certain embodiments, the supercritical heating chamber is continuously vented during the heating process utilizing a venting system that maintains sufficient back pressure so that supercritical conditions can be achieved.

After the heating process finished, the release valve is kept open until the temperature and the pressure inside drying chamber reach to room temperature and room pressure. At this point, the drying chamber is heated up again to get the temperature inside the drying chamber reaches 270° C. Meanwhile, a vacuum pump is used to pump the residue gas inside the drying chamber via a port. This combination of heating and pumping will effectively degas the remaining absorbed gas molecules from the silica aerogel. Normally, this degassing process last for one hour or so. After the degassing process, the drying chamber's lid is opened and the prepared silica aerogel samples are taken out from the chamber. The aerogel samples are ready for insulation applications.

Systems and Devices for Manufacturing Aerogels.

Figure 3:
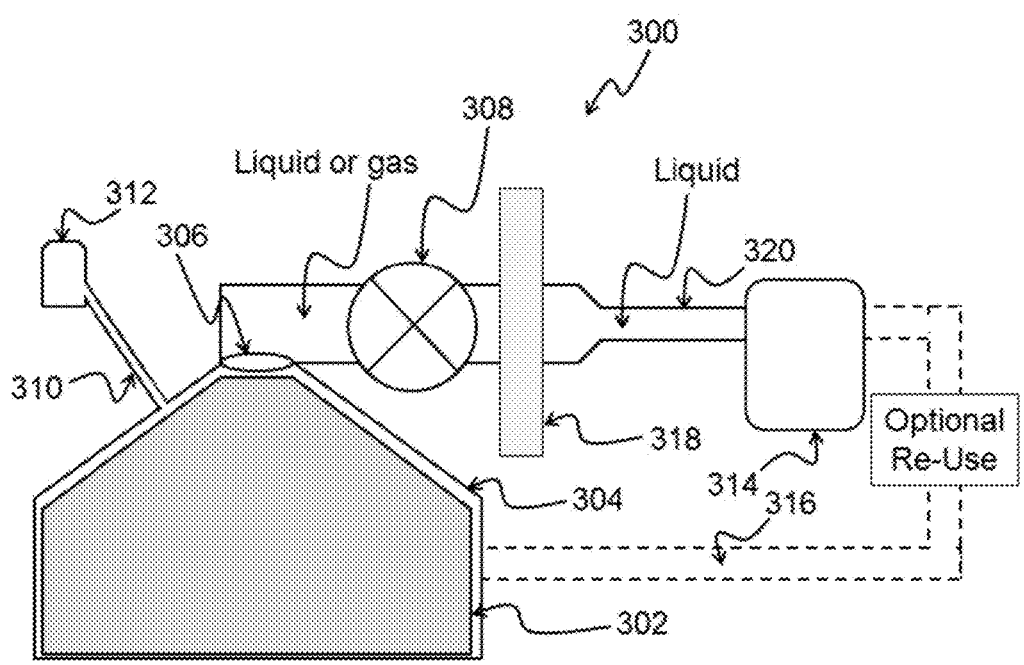
FIG. 3 schematically illustrates components of a system/apparatus 300 for manufacturing an aerogel as described herein.

FIG. 3 schematically illustrates components of a system/apparatus 300 for manufacturing an aerogel as described herein. The aerogel precursor 302 or an insulator structure containing the aerogel precursor is placed in a supercritical drying vessel 304. The supercritical drying vessel 304 comprises or is in fluid communication with one or more vents 306 and/or valves 308, and/or fluid lines 320 that are configured to vent the alcohol or $CO_2$ into a reservoir chamber 314 configured to capture the alcohol or $CO_2$ released from the supercritical drying vessel during a super critical drying operation.

In certain embodiments, the fluid lines 320 have an inside diameter sufficiently small to maintain a backpressure sufficient to maintain the supercritical pressure in the drying vessel 304. In certain embodiments the fluid lines pass through a condenser 318 that insures that the fluid passing into the small diameter fluid lines is all a liquid so that the small lines effectively maintain the desired back pressure.

In certain embodiments, the reservoir chamber is optionally provided with vents, and/or valves and/or fluid lines 316 that facilitate the re-use of the alcohol or carbon dioxide in subsequent aerogel manufacturing operations.

In various embodiments, the supercritical drying chamber 304 may further comprise a vacuum port 310 coupled to a vacuum source 312 (e.g., a vacuum pump) that facilitates further vacuum and/or vacuum/high temperature drying of the aerogel.

Illustrative Aerogel Synthesis.

In one illustrative, but non-limiting embodiment, the prepared aerogel precursor (ethanol gel) is put into a supercritical drying chamber along with a small amount of ethanol (e.g., only 1-2% of the total chamber volume). In various embodiments this ethanol comprises 2 to about 10% water. In certain embodiments, this ethanol comprises about 95% ethanol or about 98% ethanol. In certain embodiments this ethanol is recycled ethanol from an earlier manufacturing operation. The function of this small amount of ethanol is to transfer heat from the chamber wall into the gel so that the temperature of the ethanol gel rises gradually. In certain embodiments, preheated ethanol first enters an ethanol evaporator before it enters the drying chamber. The chamber lid is closed and fastened. Pressurized gas mixed, optionally mixed with a small amount of helium fills the chamber via a valve to provide a positive pressure inside the chamber. Helium vacuum leak detecting equipment can optionally be used to check if there is any leak from the fastened chamber lid. The chamber is then heated gradually. To improve the supercritical drying process efficiency and increase productivity, several multiple drying chambers can be used in parallel. The temperature inside the drying chamber rises slowly while the pressure inside the chamber also increases gradually, until the supercritical point for ethanol is reached and then slightly passed. In certain illustrative, but non-limiting embodiments it takes about 2.5 to about 3.5 hours to reach the supercritical condition inside the drying chamber. In certain embodiments the temperature range inside the chamber should be about 255-260° C. while the pressure inside the chamber is kept in the range of 8-10 MPa.

In certain embodiments the temperature and pressure inside the chamber are maintained for about 0.5 to about 1 hour before a releasing valve is used to gradually leak the ethanol vapor out of the drying chamber while letting the pressure inside the chamber lower to the room pressure. In certain embodiments the, the chamber should is kept at about 255° C.-260° C. in certain embodiments during the pressure release process the ethanol vapor is passed through a condenser where it is condensed into a liquid and optionally stored in a chamber for reuse at alter time.

After the chamber pressure reaches the atmospheric pressure, a vacuum pump can be used to pump out the residue ethanol vapor while the drying chamber is still kept at a higher temperature. This process will efficiently degas the absorbed gas molecules on the aerogel surfaces. In one illustrative, but non-limiting embodiment this degassing process lasts about 0.5 to about 4 hours, or about 0.5 to about 3 hrs, or about 0.5 to about 2 hrs, or about 0.5 to about 1 hr.

After the degassing process finishes, air can be slowly released into the chamber while the chamber cools. This cooling process normally proceeds until the aerogel material's temperature is low enough to be taken out from the drying chamber (e.g., about ½ hr).

In some embodiments, low-density network of fibers can be added during ethanol precursor gel is prepared to enforce the mechanical properties of silica aerogel end products. The density of fibers should be as low as possible to reduce the effect of the higher density to the insulation performance.

In some embodiments, waste ethanol with water content between 5-10% can be used for preparation of the precursor precursor gel. The supercritical drying process that produces the low density silica aerogel products will also result in less than 2% water containing ethanol collected, which can then be reused for the ethanol precursor gel preparation steps or sold as a by-product. As a result, this ethanol supercritical drying process actually produces higher concentration (e.g., higher than 95%) ethanol as a by-product. In this way, the high cost of using pure ethanol is eliminated.

Aerogel Chemistry.

Sol-Gel Chemistry

As indicated above, the formation of aerogels, in general, involves two major steps, the formation of a wet gel, and the drying of the wet gel to form an aerogel. While the aerogels contemplated herein can be fabricated of a number of materials including, but not limited to carbon aerogels (U.S. Patent Publication Nos: 2010/0187484 A1; 2010/0190639 A1; 2011/0024698 A1 which are incorporated herein by reference for the aerogel materials and formulations described herein), sodium silicate, silica (both hydrophilic and hydrophobic), transition metal oxides, lanthanide oxides, actinide oxides, main group oxides, mixed matrix oxides, polymers such as phenolics, polyureas, polyurethanes, polyimides, and polyamides, amorphous carbon, graphitic carbon, carbon nanotubes, and graphene, and the like.

In certain embodiments, the aerogels contemplated herein may be a silica aerogel, a carbon aerogel, an alumina aerogel, a chalcogel, an organic aerogel, or combinations thereof. In still other embodiments, the aerogel of the present invention may be a metal oxide aerogel. In yet other embodiments, the aerogel may be an aerogel of silica, titania, zirconia, alumina, hafnia, yttria, ceria, carbides, nitrides and any combination thereof.

In certain embodiments, the aerogels contemplated herein are hydrophobic aerogels including, but not limited to polymer crosslinked aerogels (x-aerogels). In still other embodiments, the hydrophobic aerogel is a poly-urea x-aerogel.

In certain embodiments the aerogels are provided as discrete aerogel monoliths. In such monoliths, the aerogels are formed of a singular aerogel unit of the desired shape, size and density.

In certain embodiments, the aerogels, particularly when used for insulators, utilize silicon alkoxide precursors. The most common of these are tetramethyl orthosilicate (TMOS, $Si(OCH_3)_4$), and tetraethyl orthosilicate (TEOS, $Si(OCH_2CH_3)_4$). However, many other alkoxides, containing various organic functional groups, can be used to impart different properties to the gel. Alkoxide-based sol-gel chemistry avoids the formation of undesirable salt by-products, and allows a much greater degree of control over the final product.

By way of illustration, the balanced chemical equation for the formation of a silica gel from TEOS is:

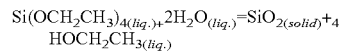

The above reaction is typically performed in ethanol, with the final density of the aerogel dependent on the concentration of silicon alkoxide monomers in the solution. Note that the stoichiometry of the reaction requires two moles of water per mole of TEOS. It has been asserted that this amount of water leads to incomplete reaction, and weak, cloudy aerogels. Most aerogel recipes, therefore, use a higher water ratio than is required by the balanced equation (anywhere from 4-30 equivalents). However, it was a surprising discovery that using the methods described herein, aerogel recipes using a lower amount of water produce an acceptable aerogel, particularly when the aerogel is to be used as an insulator. Accordingly, in certain embodiments, the mixture comprises a ratio of silicon alkoxide to water of about 1:(1.5-3), or about 1:2.

In certain embodiments, the ratio of silicon alkoxide: alcohol:water is about 1:(2-4):(1.5-3) or about 1:3:(1.5-3), or about 1:3:2. In certain, but non limiting illustrations of these embodiments, the catalyst is present at a ratio of about (0.01 to 1) or about 0.05 or 0.06. Thus, by way of non-limiting illustration, the following rations of silicon alkoxide:alcohol:water:catalyst are contemplated: 1:(2-4):(1.5-3):(0.01-1), or about 1:3:(1.5-3):(0.01-1), or about 1:3:2:(0.01-1), or about 1:(2-4):(1.5-3):(0.06), or about 1:3:(1.5-3):(0.06), or about 1:3:2:(0.06), or about 1:(2-4):(1.5-3):(0.05), or about 1:3:(1.5-3):(0.05), or about 1:3:2:(0.05).

Catalysts

The kinetics of the above reaction are impractically slow at room temperature, often requiring several days to reach completion. For this reason, acid or base catalysts are added to the formulation. The amount and type of catalyst used play key roles in the microstructural, physical and optical properties of the final aerogel product. Acid catalysts can include, but are not limited to, any protic acid, such as HCl, HFl, and the like. Basic catalysts can include, but are not limited to, ammonia, ammonia buffered with ammonium fluoride, and the like.

Aerogels prepared with acid catalysts often show more shrinkage during supercritical drying and may be less transparent than base catalyzed aerogels. As condensation reactions progress the sol sets into a rigid gel. Where the gel is molded, at this point the gel can be removed from its mold. However, the gel must is typically kept covered by alcohol to prevent evaporation of the liquid contained in the pores of the gel. Such evaporation causes severe damage to the gel and will leads to poor quality aerogels Single-Step Vs. Two-Step Aerogels In various embodiments, the aerogels contemplated herein include, single-step aerogels as well as two-step aerogels. Typical acid or base catalyzed TEOS or TMOS gels are often classified as "single-step" gels, referring to the "one-pot" nature of this reaction. Another approach uses pre-polymerized TEOS or TMOS as the silica source. In one illustrative, but non-limiting embodiment, pre-polymerized TEOS or TMOS can be prepared by heating an ethanol solution of TEOS or TMOS with a sub-stoichiometric amount of water and an acid catalyst. The solvent is removed by distillation, leaving a viscous fluid containing higher molecular weight silicon alkoxy-oxides. This material is redissolved in ethanol and reacted with additional water under basic conditions until gelation occurs. Gels prepared in this way are known as "two-step" acid-base catalyzed gels.

Pre-polymerized TEOS is available commercially in the U.S. from Silbond Corp. (Silbond H-5). These slightly different processing conditions impart subtle, but important changes to the final aerogel product. Single-step base catalyzed aerogels are typically mechanically stronger, but more brittle, than two-step aerogels. While two-step aerogels have a smaller and narrower pore size distribution and are often optically clearer than single-step aerogels.

Aging and Soaking

When a sol reaches the gel point, it is often assumed that the hydrolysis and condensation reactions of the silicon alkoxide reactant are complete. However this gel point simply represents the time when the polymerizing silica species span the container containing the sol. At this point the silica backbone of the gel contains a significant number of unreacted alkoxide groups. In fact, hydrolysis and condensation can continue for several times the time needed for gelation. Accordingly, when fabricating the gel, sufficient time is given for the strengthening of the silica network. This can be enhanced by controlling the pH and water content of the covering solution. Common aging procedures for base catalyzed gels typically involve soaking the gel in an alcohol/water mixture of equal proportions to the original sol at a pH of 8-9 (ammonia). In certain illustrative, but non-limiting embodiments, the gels are left undisturbed in this solution for up to 48 hours. This step is diffusion controlled. That is, transport of material into, and out of, the gel is unaffected by convection or mixing (due to the solid silica network). Diffusion, in turn, is affected by the thickness of the gel. In short, the time required for each processing step increases dramatically as the thickness of the gel increases. In certain embodiments this limits the practical production of aerogels to 1-2 cm-thick pieces.

In typical aerogel protocols, after aging the gel, all water still contained within its pores is removed prior to drying. This is simply accomplished by soaking the gel in pure alcohol several times until all the water is removed. Again, the length of time required for this process is dependent on the thickness of the gel. Any water left in the gel will not be removed by supercritical drying, and will lead to an opaque, white, and very dense aerogel.

However, it was a surprising discovery that using the methods described herein, this drying step can be eliminated. Accordingly, in any of the aerogel fabrication processes described herein, it is contemplated that this alcohol substitution step be eliminated.

Supercritical Drying

The final, and most important, process in making silica aerogels is supercritical drying. This is where the liquid within the gel is removed, leaving only the linked silica network. The process can be performed by venting the solvent (e.g., ethanol) above its critical point (e.g., at high temperature and high pressure) or by prior solvent exchange with $CO_2$ followed by supercritical venting (lower temperature and pressure). This process is performed in a supercritical drying vessel which is designed to withstand the necessary temperature and pressure. The process is as follows.

When supercritical drying is performed in alcohol, the gel (or a structure such as an insulator structure containing the gel) is placed into the supercritical drying chamber. The gel is maintained submerged under alcohol. Typically, pure (e.g. absolute or anhydrous alcohol) is used. However, was a surprising discovery that using the methods described herein, alcohol comprising about 2% to about 10% water can be used. In certain embodiments, 95% alcohol is used. It was also a surprising discovery that alcohol recovered from a previous aerogel supercritical drying process (typically about 98% alcohol) can also be effectively used.

Typically the supercritical drying chamber is sealed and heated up to produce the desired temperature and pressure. Then the chamber is vented to release the alcohol.

As indicated above, because of the expansion of the alcohol typically the supercritical drying chamber was about ⅓ full or less resulting in poor resource utilization.

It was discovered that the drying chamber can be continuously vented while maintaining sufficient back pressure to allow the chamber to reach a supercritical drying temperature and pressure. This permits release of the alcohol as it expands and allows the chamber to be filled to a higher level (e.g., at least 50% full, or at least 80% full, or at least 90% full, etc.) resulting in better utilization. In one illustrative, but non limiting embodiment, such venting can be achieved by providing a vent through release lines that are sufficiently small diameter that the desired backpressure is maintained. In certain embodiments the vent can further comprise a condenser to insure that the alcohol flowing through the narrow diameter lines is a liquid (see, e.g., FIG. 3).

When supercritical drying is performed in $CO_2$, the aerogel is placed in the supercritical drying vessel (which has been filled with ethanol). The system is pressurized to at least 750-850 psi with CO2 and cooled to 5-10° C. Liquid CO2 is then flushed through the vessel until all the ethanol has been removed from the vessel and from within the gels. When the gels are ethanol-free the vessel is heated to a temperature above the critical temperature of CO2 (31° C.). As the vessel is heated the pressure of the system rises. CO2 is carefully released to maintain a pressure slightly above the critical pressure of CO2 (1050 psi). The system is held at these conditions for a short time, followed by the slow, controlled release of CO2 to ambient pressure. As with previous steps, the length of time required for this process is dependent on the thickness of the gels, in certain embodiments the process may last anywhere from 12 hours to 6 days.

Functionalizing Aerogels.

While aerogels need not be functionalized to act as effective insulators, in various embodiments, the aerogels can readily be functionalized. There are three points in the process of making an aerogel where it can readily be functionalized: during gelation of the precursor gel, after gelation of the precursor gel, and after supercritical drying.

Functionalizing During Gelation

To functionalize during gelation, reactive monomers are included in the sol-gel process used to produce the gel precursor, resulting in a gel network with special chemical. Examples include using methyltrimethoxysilane along with TMOS to put hydrophobic methyl (—$CH_3$) groups onto a silica gel's backbone so that the resulting aerogel is hydrophobic.

Functionalizing after Gelation

Once a gel has formed, reactive molecules can be introduced into the gel's pore network by diffusion. Once the reactive molecules find their way into the pore network, a chemical reaction between the reactive molecules and the gel backbone can be initiated. The result is the bonding of the reactive molecule to the gel backbone, covering the backbone with new chemical groups. One illustrative, but non-limiting example is the reaction of trimethylchlorosilane with —OH groups to form —$OSi(CH_3)_3$ groups on the backbone.

Functionalizing after Supercritical Drying

Functionalization after supercritical drying is similar to functionalization of a wet gel after gelation as described for above, except the reactive molecules are introduced as a vapor into the pore network of an aerogel (not a wet gel). The vaporous reactive molecules diffuse their way through the dry pore network to a surface group on a strut in the pore network, where a chemical reaction can be initiated resulting in the formation of special functional groups on the surface of the strut.

Numerous functionalized variants of aerogels are known to those of skill in the art. One illustrative, but non-limiting example is to make brittle silica aerogels superstrong and tough by functionalizing the surface with polymers.

Insulators Comprising Aerogels.

In various embodiments insulators (e.g., heterogeneous aerogel packages) are provided to separately reduce the gas and radiation contribution to the thermal conductivity.

In order to reduce or eliminate the gas contribution to the thermal conductivity, aerogel insulators are provided where the aerogels are provided under a low vacuum. The first term $\lambda_g$ of Eq. 4, parameter $\phi$ characterizes the micro-void size structure (in micron meters), and its equivalent effect to reduce the gas thermal conductivity values under. In other words, to reduce the gas conductivity contribution to 1 mW/(m·K) level (similar value for 1% density aerogel solid thermal conductivity) in an empty vacuum layer, one needs to create a vacuum pressure at 0.05 Pa. However, by using a silica aerogel with $\phi=0.6$ μm to fill the same vacuum layer, the required vacuum pressure is only about 1000 Pa, a factor of more than 4 orders of magnitude difference in vacuum condition required. Thus, it was determined that packing aerogel in a moderate vacuum enclosure (e.g., about 500 to 1500 Pa, or about 600 Pa to about 1400 Pa, or about 700 Pa to about 1300 Pa, or about 800 Pa to about 1200 Pa, or about 900 Pa to about 1100 Pa), or about 1000 Pa will basically eliminate the first term contribution of Eq. 4.

Figure 4:
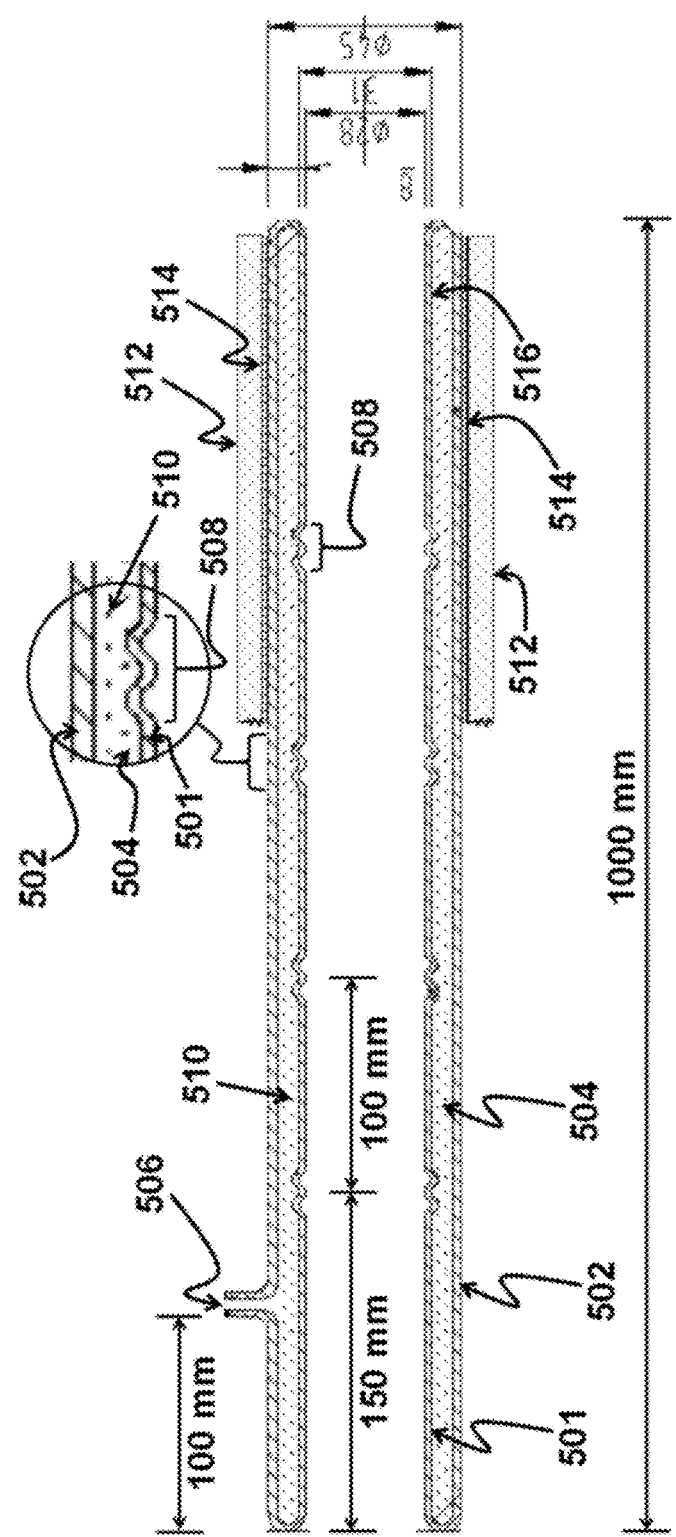
FIG. 4 illustrates the cylinder structured packaging container with quartz (Pure $SiO_2$) and glass for our innovative application method to optimize the insulation effectiveness for our silica aerogel.

For higher temperature applications, quartz (Pure $SiO_2$) and glass packaging materials can be used. FIG. 4 illustrates one non-limiting embodiments of a glass or quartz insulator 500. Concentric double tubes of quartz or glass 501 and 502 are heat sealed at both ends forming an inner wall 501 and an outer wall 502 and defining an internal volume 504 between the inner wall 501 and the outer wall 502. This internal volume acts as a container for the aerogel. A small open tube or port 506 opens into the internal volume. To prevent cracking by stress due to thermal expansion of inner tube, an annular structure (wavering) structure(s) 508 in the inner tube are created to relax the stress. Precursors of aerogel 510 are then loaded into the internal volume 504 through the tube or port 506 as a sol, before the mixture gels. Additionally, in certain embodiments, a flexible packaging vacuum insulation layer 512 (for clarity shown only partially covering the structure) can be added to further improve the insulation. The container is put into the supercritical drying vessel and, after gel formation, the supercritical drying process is performed, optionally followed by a heating and/or vacuum drying step, e.g. as described herein. In certain embodiments, and inert gas (e.g., argon) is re-filled the into the drying vessel before opening up. The tube/port 506 is then sealed, e.g., under a vacuum or while applying a vacuum leaving the aerogel in the internal volume 506 under a partial vacuum, e.g., at a pressure of about 1000 Pa or lower.

Figure 5:
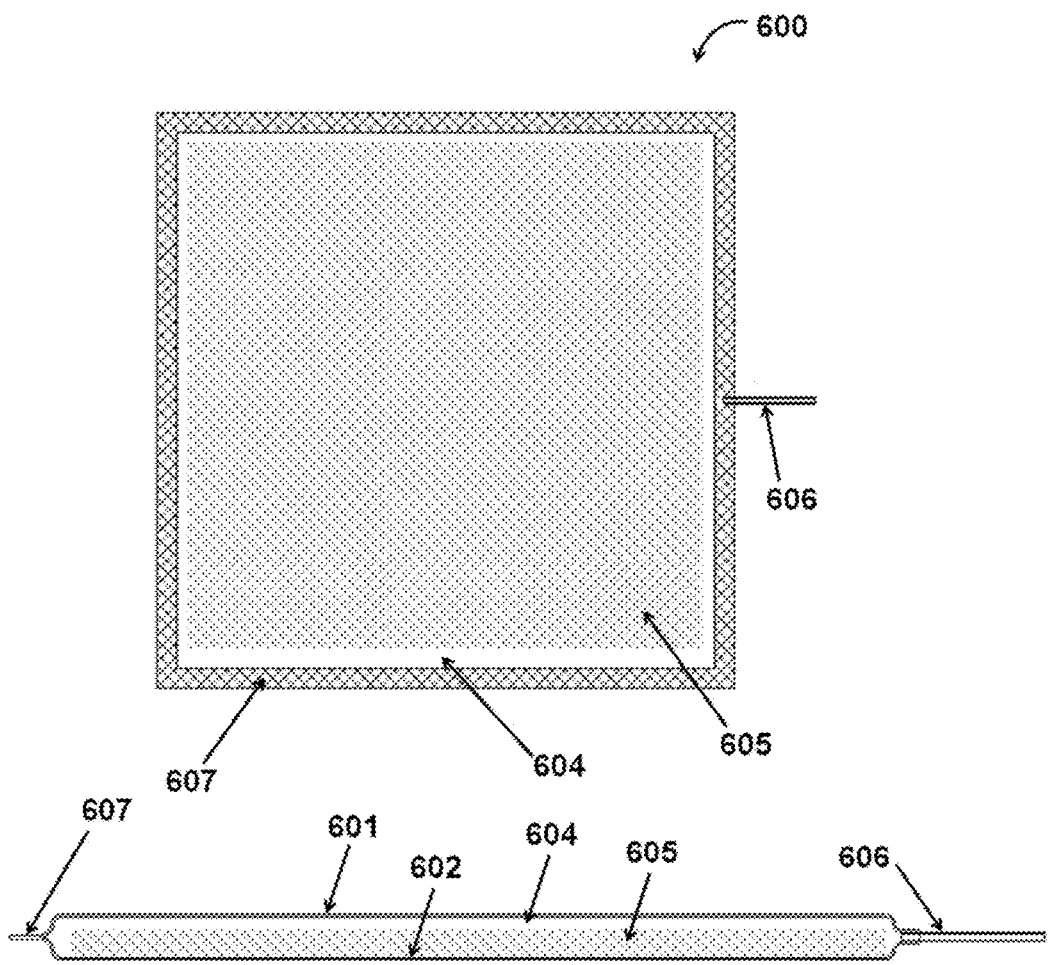
FIG. 5 illustrates a flat slab structured packaging container with polyimide for our innovative application method to optimize the insulation effectiveness for our silica aerogel. Upper panel is top view, lower panel is side view.

For medium or low temperature applications, polyimide (PI) or Teflon materials and certain plastics and other materials, that can withstand the supercritical drying conditions are used to form flat slab structured containers 600 as illustrated in FIG. 5. As illustrated in this figure polyimide (PI) (or other plastic) films 601 and 602 are heat welded or glued together to form a seal 607 on the sides and to define an internal volume 604 and leaving a small open tube or port 606 at one side. The internal volume 604 forms a container for the aerogel. In one illustrative, but non-limiting embodiment, containers or bags are made before gel formation process; the aerogel precursors 605 are filled into the packaging container through the tube or port 606 before the drying process. The insulator structure can finally be vacuum-sealed after the drying process.

In various embodiments, highly reflective thin films of metals (e.g., 514 and 516 in FIG. 4) can be inserted between thin layers of aerogel to reduce or eliminate the blackbody radiation contribution of thermal conductivity. These layers can be either inside or outside of vacuum packaging. For such heterogeneous structures, radiative thermal conduction is reduced or eliminated by the highly reflective metal films rather than by the use of additives such as carbon or increased aerogel density. Similarly, one-layer, two-layers, or a plurality of flexible packaged silica aerogels 600 in FIG. 5 can be used for medium or low temperatures applications.

Figure 6:
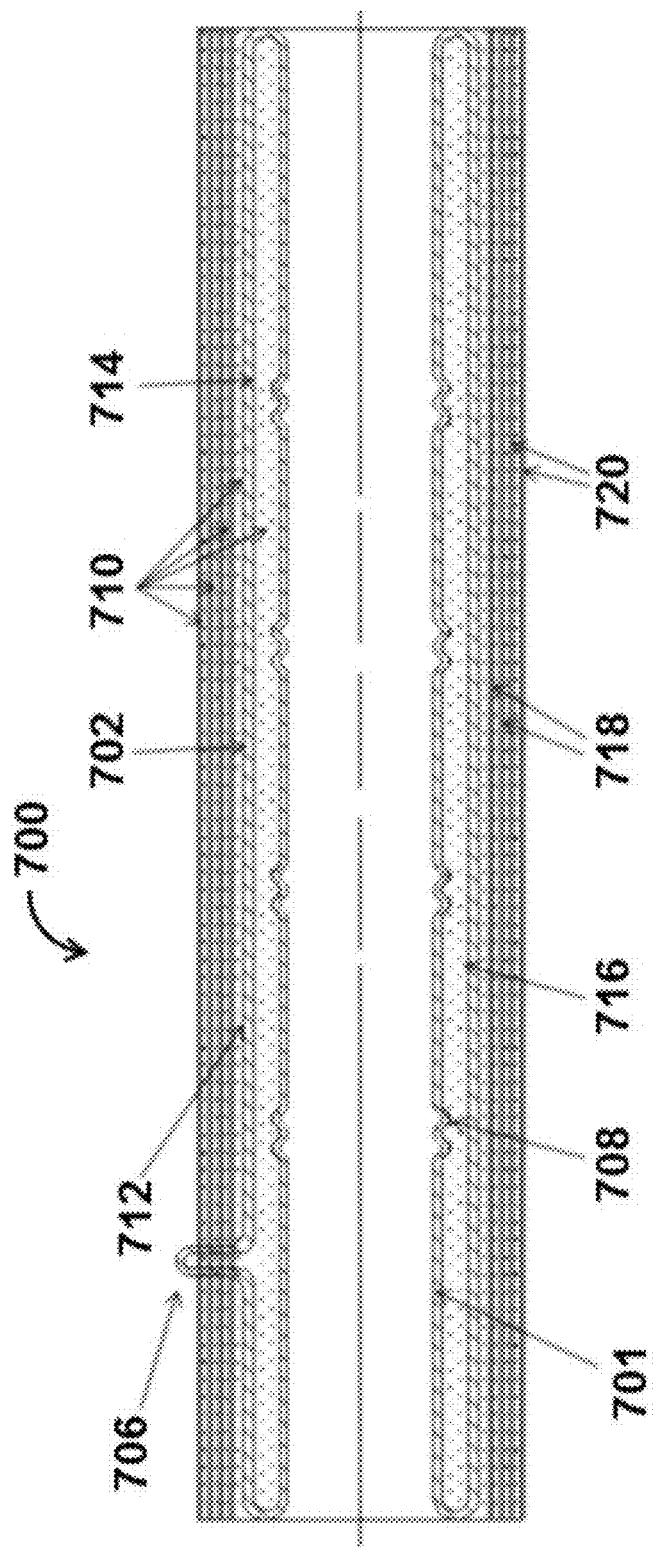
FIG. 6 illustrates a glass cylinder structured packaging container with flexible polyimide packaging wrapped on the outer tube to optimize the insulation effectiveness for the silica aerogel.

FIG. 6 illustrates one non-limiting embodiments of a cylindrical insulator 700 with highly reflective thin films of metals either inside or outside of the glass tube and with flexible packaged silica aerogel layers 718 and 720. The insulator comprises concentric double tubes of quartz or glass 701 and 702 heat sealed at both ends leaving a small open fill port or tube 706. To prevent cracking by stress due to thermal expansion of inner tube, wavering (annular) structures 708 in the inner tube are created to relax the stress. Precursors of aerogel 710 filled in from the port or tube 706. Flexible packaging vacuum insulation layers 712 are added to further improve the insulation.

For such heterogeneous structures, radiation terms are derived differently. Since for low-density aerogels without carbon or other additives, the absorption is low, therefore it can be neglected. When the number of radiation shields is n in a cylindrical aerogel insulation structure, the energy transferred by radiation $Q_r$ can be expressed by following equation:

$$Q_r = \frac{2\pi\sigma(T_1^4 - T_{n+2}^4)}{\frac{1-\varepsilon}{\varepsilon}\left(1 + 2\sum_{i=2}^{n+1}\frac{r_1}{r_1+(i-1)d} + \frac{r_1}{r_{n+2}}\right) + \sum_{i=1}^{n+1}\frac{r_1}{r_1+(i-1)d}} \quad \text{(Eq. 8)}$$

Where, i varies from two to n+1; $Q_r$ is the heat flux of radiation, in W; $T_1$ is the temperature of the hot surface for the insulation aerogel layer, in K; $T_{n+2}$, is the temperature of the cold surface of aerogel, in K; $\varepsilon$ is the emissivity of the radiation shields; $r_1$ is the radium of hot surface, in m; $r_i$ is the radium of number i radiation shields; n, is the number of radiation shields; $r_{n+2}$, is the radium of the cold surface (see, e.g., (Howell et al. *Thermal Radiation Heat Transfer*[M], Fifth Edition, Pp. 591-595).

Consider the current situation is for a cylindrical configuration, according to Eq. 3, the relationship of the thermal energy flux $Q_r$ versus the effective conductivity $\lambda_r$ for the radiation can be expressed by the following equations:

$$Q_r = \frac{2\pi\lambda_r(T_1 - T_{n+2})}{\ln\left(\frac{r_{n+2}}{r_1}\right)} \quad \text{(Eq. 9)}$$

and $$\lambda_r = \frac{\sigma(T_1 + T_{n+2})(T_1^2 + T_{n+2}^2)}{\frac{1-\varepsilon}{\varepsilon}\left(1 + 2\sum_{i=2}^{n+1}\frac{r_1}{r_1+(i-1)d} + \frac{r_1}{r_{n+2}}\right) + \sum_{i=1}^{n+1}\frac{r_1}{r_1+(i-1)d}}\ln\frac{r_{n+2}}{r_1} \quad \text{(Eq. 10)}$$

where d is the diameter of aerogel insulation layer system.

The denominator in equation 10 represents the thermal resistance for the radiation shields. Increasing the numerical value of the denominator can decrease the thermal flux effectively. Therefore, reducing the emissivity of shields or increasing the number of shields, the thermal resistance will be increased. One of the best radiation shields is to use Aluminum (or gold, since its inert property can survive the high temperature drying process) thin film coated on the surfaces of a cylindrical glass tube as the shield. In this way, the emissivity of this radiation shield can be as low as 0.02. Other metallic surfaces with polishing surface may also have relatively low emissivity and can also be used as the radiation shields. For polyimide flat slab containers, aluminum thin film coating on polyimide thin films can be used as radiative shields between polyimide aerogel container slabs.

Reducing the number of radiation shields n to zero in Eq. 10, we obtain, for the case of no radiation shield is used inside or outside the glass or heated tube, the radiation thermal conductivity expression as following:

$$\lambda_r = \frac{\sigma(T_1^2 + T_2^2)(T_1 + T_2)}{\frac{1-\varepsilon}{\varepsilon}\left(1 + \frac{r_1}{r_2}\right) + \frac{r_1}{r_2}}\ln\frac{r_2}{r_1} \quad \text{(Eq. 11)}$$

Where, the ratio of $r_1/r_2$ is the surface area ratio for the cylindrical aerogel insulation structure. For a slab structure, this ratio is 1 so we go back to the original equation in Eq. 4, second term.

According to Eq. 7, the contribution from solid thermal conduction can be described as $\lambda_s = c\rho^b$, where $\rho$ is the density of the silica aerogel. In fact, $\lambda_s$ may also depend on the temperature, which can be described in the following equation $$\lambda_s = \rho^b(C + \beta T) \quad \text{(Eq. 12)}$$

where the first term is independent on the temperature and is the same as described before, the second terms describes the temperature dependence where $\beta$ is the temperature dependent coefficient and T is the working temperature of the silica aerogel. Using the experimental data that obtained under given testing conditions, we can determine the values of c and $\beta$.

If the density of the silica aerogel is 20 kg/m³, insulation layer pressure is 10 Pa, the working temperature range is from T=373K to 673K. We can add shielding films (e.g., aluminum films) with emission coefficient of 0.02 on both of the inner and out tubes to reduce the thermal radiation loss. Using the experimental data taken under these conditions, we fit Eq. 8 to obtain parameters c and $\beta$ for $\lambda_s$ as following: $c=1.8\times10^{-6}$, $\beta=5\times10^{-11}$. Hence, we have the final expression for $\lambda_s$:

$$\lambda_s = \rho^2(1.8\times10^{-6} + 5\times10^{-11}T) \quad \text{(Eq. 13)}$$

It should be noted that although the parameters c and $\beta$ in Eq. 13 are obtained under the conditions described above, the temperature dependent coefficient $\beta$ can be neglected for thermal loss via solid conduction of the silica aerogel.

In summary, we use a heterogeneous structure containing 1) thin and highly effective radiation reflective shields interface walls and sandwich layers, 2) low density and semitransparent aerogel insulation layers without adding carbon or other additives. Heterogeneous structure solved the contradiction described above by successfully reducing or eliminating the blackbody radiation thermal loss by highly thermal conducting, but highly reflecting thin film materials, and reducing the solid conduction term by reducing the aerogel density.

In some embodiments, using the silica aerogel material in a thermal insulation application, thin and highly reflective metallic films are used inside a given thickness of silica aerogel insulation layers to reduce the blackbody radiation thermal loss. In some embodiments, as illustrated in FIG. 4, single, double or multiple layers of such highly reflective radiation shielding films (514 and 516 in FIG. 4) are implemented to greatly reduce the blackbody radiation thermal loss. According to Eq. 10, using metal thin film coated on the surfaces of a glass tube or polyimide can produce a highly reflective shield. It's $\varepsilon$ is usually as low as 0.02, which effectively reduces the contribution of the radiation thermal loss by a factor of $\varepsilon_0/\varepsilon$, where $\varepsilon_0$ is the emission coefficient for a non-reflective coating material. Since the reduction of blackbody radiation contribution for the thermal conduction does not dependent on the total absorption as the conventional method, no extra absorption agents are needed. Therefore, according to Eq. 13, very low-density silica aerogels should be used to secure a very low total thermal conduction. The benefit of producing such a low-density aerogel is to dramatically reduce the cost of raw materials during the manufacturing process. Due to the extension of gel formation time for very low-density aerogel, the optimal silica aerogel density should be in the range of 0.5-1%, and a less optimal range should be 0.1-5%.

Blackbody radiation depends greatly on the temperature of surface such as reflective metallic films in the system. Because of the existence of conduction by solid, the reflective film will has different temperature when set at different position, and thus cause different energy transfer flux. Consider radiation combined with conduction, add one shield (n=1) to the system firstly for an example to analysis the position of shield. For a heat steady state, the energy is conserved at the shield, which means the energy transfer into shield equates to the energy transfer out from the shield, described as the following equation, $$Q = \frac{T_1 - T_2}{\frac{1}{2\pi\lambda}\ln\frac{r_2}{r_1}} + \frac{2\pi\sigma(T_1^4 - T_2^4)}{\frac{1-\varepsilon}{\varepsilon}\left(\frac{1}{r_1} + \frac{1}{r_2}\right) + \frac{1}{r_1}} = \qquad \text{(Eq. 14)}$$

$$\frac{T_2 - T_3}{\frac{1}{2\pi\lambda}\ln\frac{r_3}{r_2}} + \frac{2\pi\sigma(T_2^4 - T_3^4)}{\frac{1-\varepsilon}{\varepsilon}\left(\frac{1}{r_2} + \frac{1}{r_3}\right) + \frac{1}{r_2}}$$

Using this Eq., one can determine the optimal positions for different numbers of radiation shields. For example, it is obviously for different values of shield position $r_2$, its temperature $T_2$ will be changed according to above equation, which cause different heat flux. $r_2$ corresponding to the minimum value of heat flux $\Phi$ is our target. For a system of $r_1$=14 mm, $T_1$=673K, $r_3$=29 mm, $T_3$=298K, $\lambda_s$=1.5 mW, $\varepsilon$=0.02, through an iteration process, the optimal position of shield $r_2$ is determined to be 18 mm. The result shows that the shield should be arranged near inner wall other than outer wall, but there should also be some interspaces between the shield and inner wall. For multilayer shields, positions can be decided by the same iteration method.

Since there should be some interspaces between the shielding films and the inner or outer wall of vacuum tube, the number and the position of shielding films should be different. In some embodiments, for the vacuum packaged tube with relative thin (0.5-3 mm) silica aerogel, shielding films coated only on the surface of inner and outer tube other than being arranged in the vacuum cylinder tube.

Figure 7:
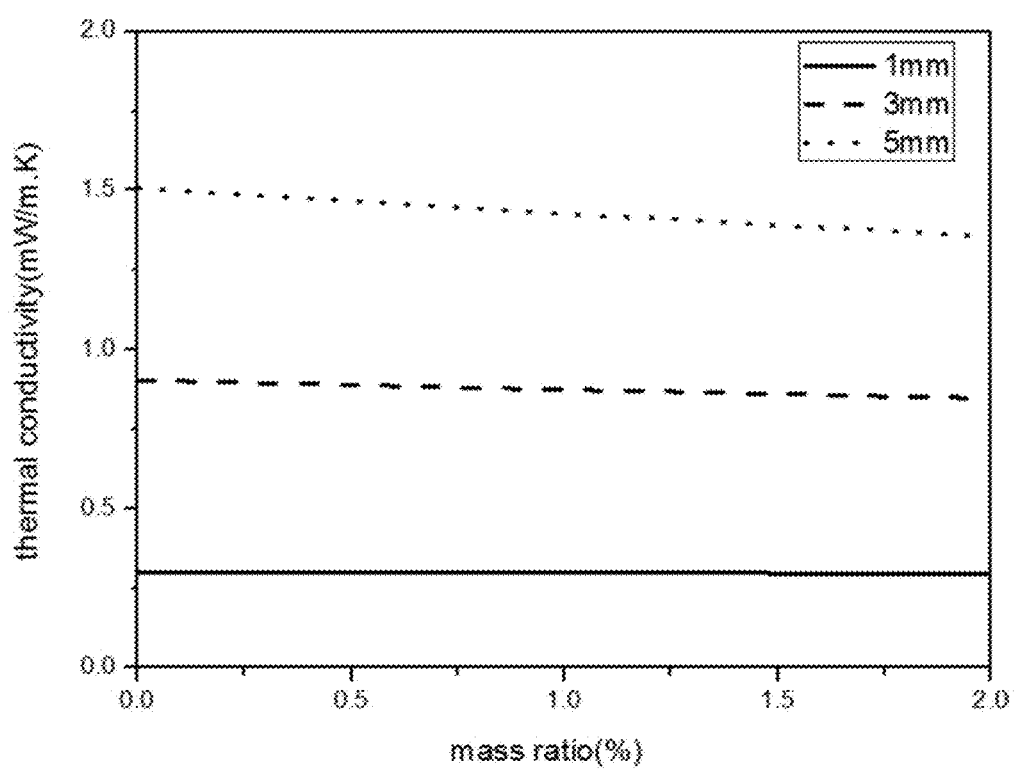
FIG. 7 illustrates the thermal radiation coefficient as function of temperature with different thickness for our silica aerogel.

FIG. 7 plots the thermal radiation coefficient as function of temperature with different thickness of silica aerogel in vacuum packaging tube. In some embodiments, the thermal radiation conductivity with silica aerogel thickness of 1 mm, 3 mm and 5 mm are described by straight line, dashed line, and dotted line as shown in FIG. 7. The thermal radiation coefficient decrease with the thickness of silica aerogel, which illustrates the advantages of thin silica aerogel (as thin as 1 mm) as good thermal insulator and provides a proof for the position of shielding films in thicker silica aerogel.

Figure 8:
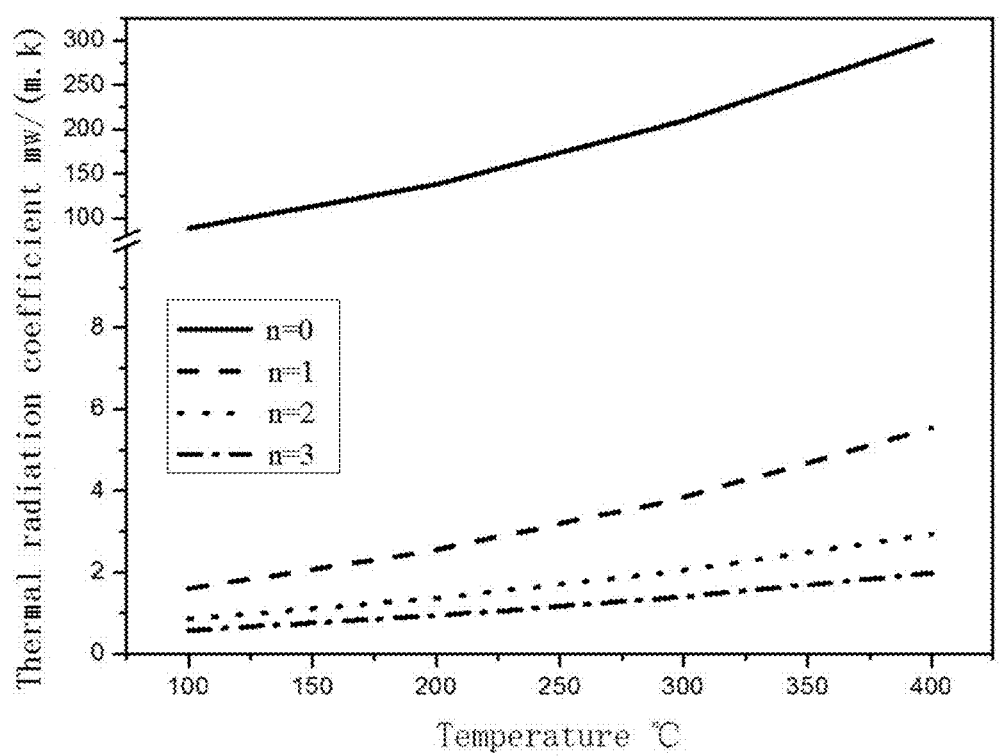
FIG. 8 illustrates the thermal radiation coefficient as function of temperature with different shields for our silica aerogel.

For the vacuum packaged tubes with relative thick silica aerogel, some shielding films should be inset into the silica aerogel. FIG. 8 plots the thermal radiation coefficient as function of temperature with different number of shields. In some embodiments, the thermal radiation coefficient without shields, with one-layer shields coated on the inner tube surface, with one and two layers be arranged between inner and outer wall are defined by straight line, dashed line, dotted line and dash dotted line. In some embodiments, the results are obtained from a system of $r_1$=14 mm, $r_0$=29 mm, $\varepsilon$=0.02 as described above.

In some embodiments, vacuum packaging of silicon oxide aerogel with highly reflective films as described above are implemented to further reduce the first term contribution in Eq. 1, since now the second and third are reduced to a very low level. In those cases, only low vacuum is needed to reduce the first term contribution to a non-significant level. As a result of above embodiments, the total thermal conduction is dominated by the solid thermal conduction, and is limited by the lower boundary of aerogel density.

In various embodiments, the structure of the sealed package can be cylinder, tabular or tile-like.

In some embodiments, the ethanol sol is put into some sealed package bags for handling and storage before the ethanol gel precursor reaction. This sealed package makes silica aerogel applicable for various shapes, reduces the possibility of pollution and prevents the aerogel material to absorb water or other unwanted gas so that during the insulation application under a vacuum condition there would be no further degas to worsen the insulation performance.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of manufacturing an aerogel, said method comprising:
   a) providing a supercritical drying vessel containing an aerogel precursor comprising a silicon alkoxide, an alcohol and a catalyst, where drying vessel comprises one or more vents and/or valves that permit fluid flow out of said chamber and wherein said vessel comprises a port in communication with a vacuum source;
   b) supercritical drying said aerogel precursor by heating said vessel while allowing the pressure in said vessel to increase until a supercritical temperature and pressure is reached and maintaining said supercritical temperature and pressure for a period sufficient to dry the aerogel;
   c) returning the vessel to atmospheric pressure, and optionally to room temperature;
   d) maintaining the heating of vessel or reheating said vessel if it has been returned to room temperature, and applying a vacuum to said port in communication with a vacuum source to degas remaining water in said aerogel and provide a dry aerogel; and
   e) returning said dry aerogel to room temperature and pressure.

2. The method of claim 1, wherein step (c) comprises returning said vessel to room pressure, but maintaining an elevated temperature.

3. The method of claim 1, wherein step (c) comprises returning said vessel to room pressure and ambient room temperature.

4. The method of claim 1, wherein said aerogel precursor comprises tetramethyl orthosilicate (TMOS, $Si(OCH_3)_4$).

5. The method of claim 1, wherein said supercritical drying vessel is continuously vented while the pressure and temperature rise to supercritical temperature and pressure.

6. The method of claim 1, wherein said chamber is more than ⅓ full of said aerogel precursor, or at least 50% full, or at least 60% full, or at least 70% full, or at least 80% full, or at least 85% full, or at least 90% full, or at least 95% full said aerogel precursor.

7. The method of claim 1, wherein the alcohol in said aerogel precursor is an alcohol comprising about 2% to about 10% water.

8. The method of claim 7, wherein the alcohol in said aerogel precursor is a 95% ethanol or methanol.

9. The method of claim 1, wherein said aerogel precursor comprises silicon alkoxide:alcohol in a ratio about 1:(2-4).

10. The method of claim 9, wherein said aerogel precursor comprises silicon alkoxide:alcohol in a ratio about 1:3.

11. The method of claim 1, wherein said aerogel precursor comprises silicon alkoxide:alcohol:catalyst in a ratio about 1:(2-4):(0.01-0.1), or about 1:3:(0.01-0.1), or about 1:3:0.06.

12. The method of claim 9, wherein the ratio of water in said precursor is about 1.5 to about 3, or is about 2.

13. The method of claim 1, wherein said catalyst comprises an acid or a base.

14. The method of claim 13, wherein said catalyst comprises ammonia and/or ammonium fluoride, or a protic acid.

15. The method of claim 1, wherein said method does not involve an alcohol substitution of the polymerized gel before said supercritical drying.

16. The method of claim 1, wherein said vessel is vented during the heating to the supercritical drying temperature and pressure and at the supercritical temperature and pressure.

17. The method of claim 1, wherein said supercritical drying is for a period of time ranging from about 10 minutes up to about 2 hours, or from about 15 minutes up to about 1.5 hrs, or from about 15 minutes up to about 1 hour, or for about 0.5 hrs.

18. The method of claim 1, wherein said heating in a vacuum is for a period of time ranging from about 10 minutes up to about 2 hours, or from about 15 minutes up to about 1.5 hrs, or from about 15 minutes up to about 1 hour, or for about 0.5 hrs.

19. The method of claim 1, wherein said supercritical drying is supercritical drying of said aerogel in an alcohol and the supercritical temperature and pressure is a supercritical temperature and pressure for said alcohol.

20. The method of claim 19, wherein said supercritical drying is supercritical drying of said aerogel after immersion in an alcohol comprising about 2% to about 10% water.

21. The method of claim 20, wherein said supercritical drying is supercritical drying of said aerogel after immersion in a 95% alcohol.

22. The method of claim 19, wherein:
said supercritical drying is at a temperature ranging from about 245° C. to about 265° C., or from about 250° C. to about 260° C. or from about 255° C. to about 257° C.; and/or
said supercritical drying is at a pressure ranging from about 6.5 MPa to about 8.8 MPa, or from about 7 MPa to about 8.5 MPa, or from about 7.5 mPa to about 8.3 M, or from about 7.8 to about 8 MPa.

23. The method of claim 19, wherein said alcohol is an alcohol that has been recaptured from a previous supercritical drying of an aerogel.

24. The method of claim 19, wherein said method further comprises releasing said alcohol from said vessel and capturing the released alcohol in a reservoir.

25. The method of claim 19, wherein said supercritical drying comprises releasing said alcohol from said vessel and passing said alcohol through one or more fluid lines whose inside diameter is sufficiently small to maintain a backpressure sufficient to maintain the supercritical pressure.

26. The method of claim 1, wherein said supercritical drying is of liquid carbon dioxide after a solvent exchange of carbon dioxide for said alcohol and the supercritical temperature and pressure is a supercritical temperature and pressure for carbon dioxide.

27. The method of claim 26, wherein:
said supercritical drying is at a temperature ranging from about 31° C. to about 50° C., or from about 31° C. to about 40° C., or from about 32° C. to about 36° C.; and/or
said supercritical drying is at a pressure ranging from about 1050 psi to about 1300 psi, or from about 1050 psi to about 1200 psi, or from about 1050 psi to about 1100 psi, or from about 1051 psi to about 1080 psi, or from about 1052 psi to about 1050 psi.

28. The method of claim 26, wherein said $CO_2$ is $CO_2$ that has been recaptured from a previous supercritical drying of an aerogel.

29. The method of claim 26, wherein said method further comprises releasing said $CO_2$ from said vessel and capturing the released $CO_2$ in a reservoir.

30. The method of claim 26, wherein said supercritical drying comprises releasing said $CO_2$ from said vessel and passing said $CO_2$ through one or more fluid lines whose inside diameter is sufficiently small to maintain a backpressure sufficient to maintain the supercritical pressure.

* * * * *